United States Patent [19]

Hsu

[11] Patent Number: 5,028,286

[45] Date of Patent: Jul. 2, 1991

[54] METHOD OF MAKING DIMENSIONALLY STABLE COMPOSITE BOARD AND COMPOSITE BOARD PRODUCED BY SUCH METHOD

[76] Inventor: Wu-Hsiung E. Hsu, 6380 Loire Drive, Gloucester, Ontario, Canada, K1C 3C8

[21] Appl. No.: 338,451

[22] Filed: Apr. 14, 1989

Related U.S. Application Data

[63] Continuation of Ser. No. 79,606, Jul. 31, 1987, which is a continuation-in-part of Ser. No. 811,773, Dec. 20, 1985.

[30] Foreign Application Priority Data

Dec. 28, 1984 [CA] Canada .................................. 471093

[51] Int. Cl.[5] .............................................. B32B 31/20

[52] U.S. Cl. .................................. 156/62.4; 156/283; 156/335; 264/109; 264/123

[58] Field of Search ..................... 156/62.2, 62.4, 283, 156/335, 322; 264/109, 123, 120; 162/21

[56] References Cited

U.S. PATENT DOCUMENTS

| | | | |
|---|---|---|---|
| 2,224,135 | 12/1940 | Boehm | 162/21 |
| 3,021,224 | 2/1962 | Meiler | 156/62.2 |
| 3,021,244 | 2/1962 | Meiler | 156/62.2 |
| 3,533,906 | 10/1970 | Reiniger | 162/13 |
| 4,162,877 | 7/1979 | Nyberg | 425/84 |
| 4,461,648 | 7/1984 | Foody | 162/21 |

*Primary Examiner*—Jenna Davis

*Attorney, Agent, or Firm*—Stanley E. Johnson

[57] ABSTRACT

Disclosed is a method of making a dimensionally stable composite board product made from a mixture of particles of a cellulose material and binder and a composite board so produced by such method. Dimensional stability is in reference to the resistance to thickness swelling when the board is subjected to high humidity or moisture conditions. The method and composite board displaying the attribute of improved dimensional stability involves subjecting the particles of cellulosic material to a pressurized steam treatment and then making the composite board under heat and pressure. When compared to conventional composite board that has not been subjected to the pretreatment, the difference in thickness swelling is significant.

10 Claims, 4 Drawing Sheets

METHOD OF MAKING DIMENSIONALLY STABLE COMPOSITE BOARD AND COMPOSITE BOARD PRODUCED BY SUCH METHOD

RELATED APPLICATIONS

This application is a continuation of application Ser. No. 07/079,606 filed Jul. 31, 1987, which is a continuation-in-part of Ser. No. 811,773, filed Dec. 20, 1985.

BACKGROUND OF INVENTION

The present invention relates to a process of making synthetic board and boards produced therefrom wherein the final product i.e. the formed board has improved dimensional stability under varying moisture conditions.

The technologies of manufacturing wood-based composites have been continuously improved. It is no longer an imagination but a reality that wood-based composites can be produced stronger and stiffer than plywood, solid wood and laminated wood. The production rate has also been significantly increased through the advances in resin technologies. However, in many applications, wood-based composites are much inferior to plywood, solid wood and laminated wood due to lack of dimensional stability. Therefore it is not exaggerated to have a statement "the most severe drawback of wood-based composites is lack of dimensional stability".

For panel products, the mat is usually formed in such a way that the grain direction of furnish is generally parallel to the panel surfaces and the pressure direction is perpendicular thereto. The furnish is compressed in the thickness direction. Consequently, the thickness direction is the most unstable direction in wood-based panels.

The thickness swelling of wood based composite panels consists of reversible and irreversible swelling when the panels absorb water or moisture. The former is due to the hygroscopic nature of wood and the latter is due to the springback of compressed wood. The reversible swelling is normally less than the solid wood because the hygroscopicity of wood is reduced by heat during hot pressing. The irreversible swelling is the main cause of instability of wood-based composites. Therefore, the irreversible swelling must be radically reduced in order to improve the dimensional stability of wood-based composites drastically.

Irreversible swelling results from the release of pent-up internal stresses in the composite absorption of water or moisture. Therefore it is reasonable to believe that highly stable composites can be produced if the composite is made in such a way that internal stresses are minimized during pressing.

Thickness swelling of wood-based composite board is undesirable particularly where such boards are used in exterior applications and other applications where uncontrolled moisture conditions exist.

The dimensional stability of a composite board or panel is normally determined by measuring the thickness swelling of the panel following controlled exposure to moisture. Conventional wood-based composite boards or panels can experience a thickness swelling ranging from 10 to 25 percent of the panel's thickness following a horizontal 24 hour cold water soak and which can range from 20 to 40 percent if subjected to a vertical 24 hour cold water soak. When subjecting a conventional panel to a 2 hour boiling period followed by a 1 hour cold water soak, thickness swelling in the range of 50 to 60 percent can be anticipated. As a result, the use of conventional composite boards and panels as a construction material is limited to installations and environments where the moisture conditions are controlled or anticipated in advance so as to take preventative steps. As a consequence, wood-based composites are regarded as undesirable for exterior applications and particularly ground contact applications because of differential dimensional changes between the wet and dry portions of the material below and above the ground. The moisture and moisture cycling effect experienced by composite panels subjected to variations in humidity or exposure to water also contribute to the break-down or degradation of the panel rendering it unfit as a construction material for the purpose intended. Indeed, building contractors are reluctant to use wood-based composite panels as a flooring or sub-flooring because the edges of a panel can exhibit greater thickness swelling than the panel's central portion and thus detracts from a substantially planer abutment joint with neighboring panels.

The dimensional stability i.e. thickness change of waferboard or other composites can be improved by increasing the resin content, press time or press temperature. Increases in resin content increase the production costs significantly and therefore is undesirable. Increasing press time also is undesirable from a production cost point of view and therefore not considered effective. Increase of press temperature is effective but results in a fire hazard and therefore again is undesirable.

A principle object of the present invention is to provide a process for producing highly stable wood-based composite board without resorting to high pressure or high temperature treatments and without increasing resin content or resorting to special high-cost resin binders.

Another object of the present invention is to provide a process for producing highly stable and bond durable products and products produced by such process which can be further treated with preservatives, fire retardants or other chemicals without causing significant damage to strength and excessive thickness swelling.

SUMMARY OF INVENTION

In accordance with the present invention, furnish i.e. wood wafers, particles, fibers or chips are exposed to a treatment with a specific combination of steam pressure and treatment time and thereafter formed into a mat or refined and then formed into a mat with adhesive. The formed mat is subjected to a pressure and heat to form a synthetic board. It has been found that the dimensional stability of the so formed composite product where the starting material has been steam-treated is considerably improved.

The principle of this invention is based on the fact that a control steam treatment can result in a break-down of hemicelluloses for both hardwoods and softwoods. Break-down of hemicelluloses results in a significant reduction of resistance to compression and thus a significant reduction in internal stresses built-up during pressing. Reduction of pent-up internal stress in the pressed composites results in an improvement in the dimensional stability of wood-based products. However, the break-down of hemicellulose must not be too severe and the steam treatment used must minimize the break-down of cellulose and lignin. Otherwise, the strength properties of products will be severely impaired.

Steam and pressure treatment of fibrous material to form a board dates back to the early 20's in what is known as the Masonite R process. Such process is a multi-stage temperature-pressure process wherein the chips are exploded through a die or restricted orifice resulting in a pulp called gun stock. In the present process there is no explosion but instead merely a heat-pressure treatment of the stock.

In carrying out the invention furnish i.e. wood chips or the like is placed in a steam treatment unit such as a high pressure autoclave or a high pressure steam cylinder whereafter the same is closed and injected with steam under pressure which may be saturated steam or dry steam for a short period of time. In utilizing saturated steam the pressure is preferably 225 to 350 psi and the time of the process of course is dependent upon the pressure. The time may for example be seconds at high pressures such as 350 psi or high temperature such 240° C. for higher dry steam. After the pressure treatment the steam pressure is bled down in such a way that the steam pressure will not cause mechanical damage to the furnish usually 50 psi or lower if the furnish geometry has to be maintained intact.

The pretreated furnish is thereafter formed into a composite board under pressure and heat. A binder such as a phenolic resin in amounts conventionally used is normally included in the mat prior to the heat-pressure treatment.

The steam pressure (temperature) and treatment time can be varied to have an optimum combination. For example, treatment time can be as short as 1 minute for steam pressure of 320 psi or treatment time can be as long as 4 minutes to have a proper treatment for steam pressure of 225 psi. In general, the degree of treatment increases linearly with increasing treatment time. Also, there is a rule of thumb that the degree of treatment can be doubled by a rise in steam temperature of 10° C., a temperature coefficient common to many chemical reactions. In general, the steam treatment must cause a mild break-down of hemicellulose in wood so that the water insoluble xylan content of hardwood will be reduced to about 16.5% or slightly lower and the total content of xylan, mannan and galactan of softwood will be reduced to about 15.5% or slightly lower, based on the ovendry weight of the water insolubles.

The following specific examples will further illustrate the practice and advantage of the present invention.

EXAMPLE 1

Waferboards, measuring ½ in.×24 in.×24 in. were fabricated with the following parameters.

1. wafers: commercial disk-cut wafers
2. wafer thickness: normally 0.027 in.
3. wafer length: 1.5 in.
4. resin type and content: powdered-phenol formaldehyde resin, 2.25%
5. wax type and content: slack wax, 1.5%
6. mat moisture content: 3.5%
7. press time: 5 min. including 11 sec. daylight close
8. press temperature: 400° F. (205° C.)

To make stable boards, wafers were treated with 225 psi pressure of steam for 2, 3 and 4 minutes before drying. For control, the boards were made with wafers without steam treatment. The results of this experiment are shown in Table 1.

TABLE 1

Thickness Swelling of the Waferboard Made from the Regular Wafers and Those Treated with Saturated Steam at 225 psi

| Treatment Time min. | Position of Measurement | Thickness Swelling After 24 hr. Cold Water Soak* % |
|---|---|---|
| 0 | Top | 12.5 |
| | Bottom | 33.4 |
| | Average | 23.0 |
| 2 | Top | 10.5 |
| | Bottom | 19.2 |
| | Average | 14.9 |
| 3 | Top | 3.9 |
| | Bottom | 15.1 |
| | Average | 11.0 |
| 4 | Top | 3.9 |
| | Bottom | 8.7 |
| | Average | 6.3 |

*Vertical Soak
- specimen Size 4 in. × 4 in.
- measured at 3 points along the lines which are 1 inch in from the top and bottom edge, 1, 2 and 3 inches from one end

EXAMPLE 2

Panels were prepared in the similar manner as Example 1 except the differences specified in Table 2. The results are shown in Table 2.

TABLE 2

Thickness Swelling of the Waferboards (½ inch thick) Made From the Wafers Which Were Treated With Saturated Steam at 250 PSI for 4 Minutes

| Resin | Position of Measurement | Duration of Soak hrs. 24 | 72 |
|---|---|---|---|
| 2.25% | Top | 2.1 | 11.8 |
| Powdered | Bottom | 4.2 | 13.0 |
| Phenol-Formaldehyde | Average | 3.2 | 12.4 |
| 3% | Top | 3.8 | 10.7 |
| Liquid | Bottom | 7.0 | 11.1 |
| Phenol-Formaldehyde | Average | 5.4 | 10.9 |

EXAMPLE 3

Panels were prepared in the similar manner as Example 1 except as follows:

| | |
|---|---|
| Board Thickness: | 7/16 in. |
| Resin Content: | 2.25% in face layers and 2.5% in core |
| Construction of Boards: | Three layers |

The results are shown in Table 3

EXAMPLE 4

Particleboards, measuring ⅝ in.×24 in.×24 in. were prepared with the following parameters.

1. Particles: fine particles for face layers; coarse particles for core
2. Resin type: urea formaldehyde resin
3. Resin content:
   face: 8.5%
   core: 5.5%
4. Press temperature: 177° C.
5. Press time: 3 minutes
6. Pretreatment of particles—control: no pretreatment steam treatment: for 4 min. at 225 psi The results are summarized in Table 4.

TABLE 3

Thickness Swelling of Waferboards Made With Treated Wafers in Face Layers and Untreated or Slightly Treated Wafers in Core

| Weight Ratio of Face/Core | Treatment Time Face | Treatment Time Core | Position of Measurement | Duration of Soak, Hr. 24 | Duration of Soak, Hr. 72 | After 72 Hr. Soak and Redried |
|---|---|---|---|---|---|---|
| 50/50 | 4.0 | 0 | Top | 6.2 | 12.5 | 8.5 |
| | | | Bottom | 12.3 | 18.1 | 12.2 |
| | | | Average | 9.3 | 15.3 | 10.3 |
| 50/50 | 4.5 | 0 | Top | 6.2 | 12.7 | 8.9 |
| | | | Bottom | 11.8 | 17.4 | 13.1 |
| | | | Average | 9.0 | 15.1 | 11.0 |
| 60/40 | 4.0 | 0 | Top | 2.6 | 9.3 | 5.7 |
| | | | Bottom | 10.8 | 16.0 | 11.2 |
| | | | Average | 6.7 | 12.7 | 8.5 |
| 60/40 | 4.0 | 2.5 | Top | 2.8 | 7.3 | 3.2 |
| | | | Bottom | 10.4 | 15.6 | 11.1 |
| | | | Average | 6.6 | 11.5 | 7.1 |
| 60/40 | 4.5 | 0 | Top | 4.6 | 11.0 | 6.2 |
| | | | Bottom | 11.1 | 16.4 | 11.4 |
| | | | Average | 7.8 | 13.7 | 8.8 |
| 60/40 | 4.5 | 2.5 | Top | 3.0 | 7.5 | 3.9 |
| | | | Bottom | 10.0 | 15.5 | 10.2 |
| | | | Average | 6.5 | 11.5 | 7.1 |

TABLE 4

Thickness swelling and Linear Expansion of Particleboard Bonded With Urea Formaldehyde Resin

| Pretreatment[a] Time, min. | Thickness Swelling, % 72 hr. Vertical Water Soak: Wet | Thickness Swelling, % 72 hr. Vertical Water Soak: Reconditioned | Linear Expansion, % from 50 to 90 RH |
|---|---|---|---|
| 1 | 16.0 | 5.8 | 0.33 |
| 2 | 11.9 | 3.3 | 0.28 |
| 3 | 9.4 | 2.1 | 0.26 |
| 4 | 8.3 | 2.0 | 0.24 |
| 5 | 7.2 | 0.8 | 0.24 |
| 0 (control) | 28.0 | 22.1 | 0.48 |

[a]at 225 psig of steam

TABLE 5

Effect of Steam Pretreatment on the Bending Properties of Waferboard

| Steam Pretreatment Pressure psig. | Steam Pretreatment Time min. | MOR psi | MOE $10^3$ psi |
|---|---|---|---|
| 225 | 2 | 3545 | 680 |
| 225 | 4 | 3500 | 800 |
| 475 | 2 | 2039 | 868 |
| 475 | 4 | 1484 | 789 |
| 0 (control) | 0 | 3562 | 509 |

TABLE 6

Effect of Steam Treatment on the Horizontal Thickness Swelling After Horizontal Cold Water Soak

| Steam Treatment Pressure | Steam Treatment Time | Thickness Swelling 24 hr | Thickness Swelling 72 h | Maximum Swelling |
|---|---|---|---|---|
| 120 | 2 | 6.2 | 14.5 | 28.7 |
| 120 | 10 | 4.0 | 10.0 | 18.1 |
| 225 | 3 | 4.0 | 9.0 | 15.0 |
| 225 | 4 | 4.0 | 8.0 | 14.0 |
| 475 | 2 | 3.9 | 9.2 | 8.8 |

TABLE 6-continued

Effect of Steam Treatment on the Horizontal Thickness Swelling After Horizontal Cold Water Soak

| Steam Treatment Pressure | Steam Treatment Time | Thickness Swelling 24 hr | Thickness Swelling 72 h | Maximum Swelling |
|---|---|---|---|---|
| 475 | 4 | 2.1 | 7.5 | 7.8 |
| 0 (control) | | 16.0 | 30.0 | 38.0 |

The above examples illustrate that the steam pressure and time used to treat furnish are critical. Over treatment will cause a drastic reduction in bending strength* and undertreatment will not lead to improvement in dimensional stability. The proper treatment should result in good dimensional stability and strength properties. The proper combination of steam pressure and treatment time must enable to significantly lower the xylan content for hardwoods and the content of xylan, mannan and galactan for softwoods. In order to achieve this, a steam pressure is preferable to be ranged from 150 to 350 psig for 1 to 6 minutes. For example, 1 minute for 350 psig steam to be used and 6 minutes for 150 psig steam to be used.

*(see Table 5)

The mat of material from which the boards are formed, may be multi-layered, for example, consisting of a core with two outer layers. The core layer may be made up from chips which have been pretreated i.e. by pressure and steam or alternatively the two outer layers may be made of chips of the pretreated cellulosic material. If desired, all three layers of course can be made of the pretreated material. In the instance where the core only is made of the pretreated material and the outer layers are not a further post-treatment can be effected by applying heat to the formed composite board at anytime to stabilize the outer layers.

TABLE 7

Analysis of Water Insolubles[a]

| Species | Steam Treatment Time (min.) | Lignin: Klason Lignin (%) | Lignin: Acid Soluble Lignin | Lignin: Total (%) | Cellulose (%) | Xylan (%) | Mannan (%) | Galactan (%) |
|---|---|---|---|---|---|---|---|---|
| Aspen | 0 | 21.16 | 3.44 | 24.60 | 44.64 | 18.90 | — | — |
| | 1 | 21.09 | 2.42 | 23.51 | 45.22 | 19.56 | — | — |
| | 2 | 22.45 | 2.15 | 24.60 | 45.85 | 18.64 | — | — |
| | 3 | 23.38 | 1.98 | 25.36 | 46.91 | 16.56 | — | — |
| | 4 | 23.99 | 1.95 | 25.94 | 51.11 | 13.32 | — | — |

TABLE 7-continued

| Species | Steam Treatment Time (min.) | Analysis of Water Insolubles[a] — Lignin — Klason Lignin (%) | Acid Soluble Lignin | Total (%) | Cellulose (%) | Xylan (%) | Mannan (%) | Galactan (%) |
|---|---|---|---|---|---|---|---|---|
| Lodgepole | 1 | 29.33 | — | — | 40.72 | 5.74 | 9.65 | 2.09 |
| Pine | 2 | 31.33 | — | — | 41.37 | 6.11 | 9.50 | 2.06 |
| | 3 | 32.74 | — | — | 42.48 | 5.78 | 8.38 | 1.36 |
| | 4 | 34.06 | — | — | 43.75 | 5.22 | 7.91 | 1.52 |

[a]The percentage of each component was based on the weight of water insolubles

In the foregoing the invention has been described by way of example with respect to pressure-steam treatment of wood chips and forming boards from the same. The process, however, in its broadest aspect involves pressure-steam treatment of ligno cellulosic material irrespective of its physical form. The material herein may be and is referred to as furnish. Furnish is wafers, flakes, particles and/or fibers of wood. These are obtined by conventionally processing trees by chippers, refiners, hammer mills, digesters, autoclaves and/or driers.

Fiber preparation is one of the most important steps in the process for fiber characteristics which have a predominant effect on the properties of final products. In general, wood chips are processed through a digester system usually consisting of a continuous digester and then discharged into a pressurized refiner. The pressure used in the digester is ranged from 100 to 150 psi g for a few minutes (e.g. 2 to 10 min.). The products made from the fibers generated by this process are dimensionally unstable when they are exposed to a high humidity environment or water. That dimensional stability is dramatically improved by treating the wood fibers with moderately high pressure steam. The wood chips can be processed through a refiner and/or defibrator in a conventional manner and the pressure steam treatment can be done before or after the defibration and/or refining process. There is, however, a minor drawback to pressure-steam treating a large quantity of loose fibers in a treatment vessel because of volume (the bulk density of fibers is very low, approximately one pound per cubic foot) but this can be overcome by compacting the loose fibers prior to pressure-steam treatment and then dispersed after treatment. Steam pressure treatment before defibration is more practical and, thus, preferred.

The dimensional stability of the final products can be further improved by subjecting the products to a high humidity environment (such as 90 percent relative humidity) for a predetermined time. This conditioning process will allow the products to expedite most of the irreversible linear expansion in a short period of time without roughening board surfaces or significantly impairing the board quality. This can be done just because the products made from the fibers prepared by the present invention are stable.

Highly stable particleboards represent a growth opportunity for the particleboard industry as a whole. New product applications for particleboard could be developed for areas (e.g. bathrooms) which have been considered to be hostile environments in the past. For secondary manufacturers (e.g. furniture and cabinet industry), there may be additional cost savings since inexpensive water borne adhesives and coatings could be used on highly stable particleboard components.

In the foregoing it has been demonstrated that the thickness swelling or particleboard bonded with urea formaldehyde (UF) resins was dramatically reduced, becoming comparable to solid wood and also the linear expansion was substantially reduced when the stabilization process of steam pretreatment was employed. It has been observed, however, that steam pretreatment alters the acidity of wood furnish and as a result, the curing of UF resins is found to be advanced. This could produce a negative effect, if the assembly time, i.e. the interval between blending and hot pressing, were prolonged. Some precure of UF resins was observed and identified as a potential problem to be overcome. Steam pretreatment also improved the compressibility of wood furnish which changed the density profile of the panels sharply in thickness direction. In turn, the ratio of modulus of elasticity to modulus of rupture was increased significantly.

In view of these facts, applicant has studied ways of improving the board quality of steam-pretreatment particleboard and considered ways of eliminating possible adverse effects on panel processing due to changes in the characteristics of wood furnish.

For the additional studies, unscreened face and core wood particles were obtained and a gyratory screen equipped with a 10 mesh screen was used to remove over-sized particles from the fine furnish for face layers and under-sized particles from coarse furnish. A commercial urea formaldehyde resin was used, and a wax emulsion.

Both fine (<10 Tyler mesh) and coarse (>10 Tyler mesh) particles were treated separately with steam prior to drying. The steam treatment was accomplished by the following steps:

(1) Wood particles were loaded into a steam treatment chamber;
(2) The chamber was closed and sealed;
(3) Saturated steam at a pressure of 225 psig (1.55 MPa) was injected for a predetermined time;
(4) The steam pressure was released and the chamber opened for unloading of treated particles.

For the preparation of particleboards, particles were dried to the desired moisture content (2 to 3%) in a batch type, forced air dryer. Resin, wax emulsion and water (where necessary) were pre-mixed prior to blending and sprayed onto the furnish in a rotating drum-type blender at an air pressure of 50 psig (0.34 MPa). In addition, ammonium hydroxide ($NH_4Cl$) was pre-mixed with the resin, wax emulsion and water to prevent precure or to expedite cure. The blended furnish was then formed into a deckle box manually and pressed at 350° F. (177° C.) for 3 minutes producing a ⅝ in. (16 mm) thick board. The other process and raw material constants used can be summarized as follows:

Board Size: ⅝ in.×20 in.×20 in. (16 mm×510 mm×510 mm)

Target Board Density: 43 lb/ft$^3$ (689 kg/m$^3$)

Board Construction: Fine particles (<10 Tyler mesh) in face layers and coarse particles (>10 Tyler mesh) in core. Weight ration of face layers to core was 50 to 60.
Resin Type: Liquid urea formaldehyde resin
Solid Content of resin: 50% (diluted with water) for face layers; 65% for core
Resin Content (solid base): 8.5% in face layers (based on oven dry weight of particles) and 5.5% in core (based on oven dry weight of particles)
Wax Type: Wax emulsion
Wax Content (solid base): 0.75% in face layers only (based on oven dry weight of particles)
Mat Moisture Content: 11.5|0.5% in face layers; 7.5|0.5% in core For the purpose of determining the effect of steam pretreatment time on board properties, the following specific parameters were used:
Steam Pressure for 225 psig (1.55 MPa) Pretreatment:
Press Pressure: 400 psig (2.76 MPa) for steam pretreated furnish; 700 psig (4.83 MPa) for untreated furnish
Inhibitor Content: 0.25% in face and core layers when steam pretreated furnish was used
Catalyst: 0.5% used in core when untreated (control) furnish was used (based on the weight of liquid UF resin)

After the boards were prepared, test specimens were cut and conditioned at a humidity of 65|5% and a temperature of 20°|2° C. for a period of three weeks so that the practical equilibrium moisture content was attained. The specimens for linear expansion were conditioned separately at a relative humidity of 50% and a temperature of 20° C. until a equilibrium moisture content was reached (change in weight of less than 0.1% during a 24 hour period). The samples were then moved to a second chamber with relative humidity of 90 percent and a temperature of 20° C. until a second equilibrium moisture content was reached. The thickness change of the linear expansion specimens was also measured to determine the thickness swelling after the absorption of water in the vapor form.

To determine the thickness swelling of particleboard, the 4 in.×4 in. (100 mm×100 mm) specimens were cut and three points were marked along a line one inch above the bottom edge. The specimens were then submerged into cold water vertically for periods of 24 hours and 72 hours. The top edge of the specimens was maintained one inch below the water level.

For the evaluation of the strength properties of particleboard the moduli of elasticity and rupture (MOE and MOR) and the internal bond strength (IB) were determined in accordance with the standard methods specified in ASTM D1037-72A. The sample size used in this study was 10.

To vary the degree of steam pretreatment, the pressure of saturated steam was maintained to be 225 psig (1.55 MPa) and pretreatment times of 0 (control, no steam treatment), 1, 2, 3, 4 and 5 minutes were selected. The properties of particleboards made with the wood furnish pretreated for various time periods are summarized in Tables 9 to 14 and illustrated in FIGS. 1 to 8, which are bar graphs wherein.

Figure 1:
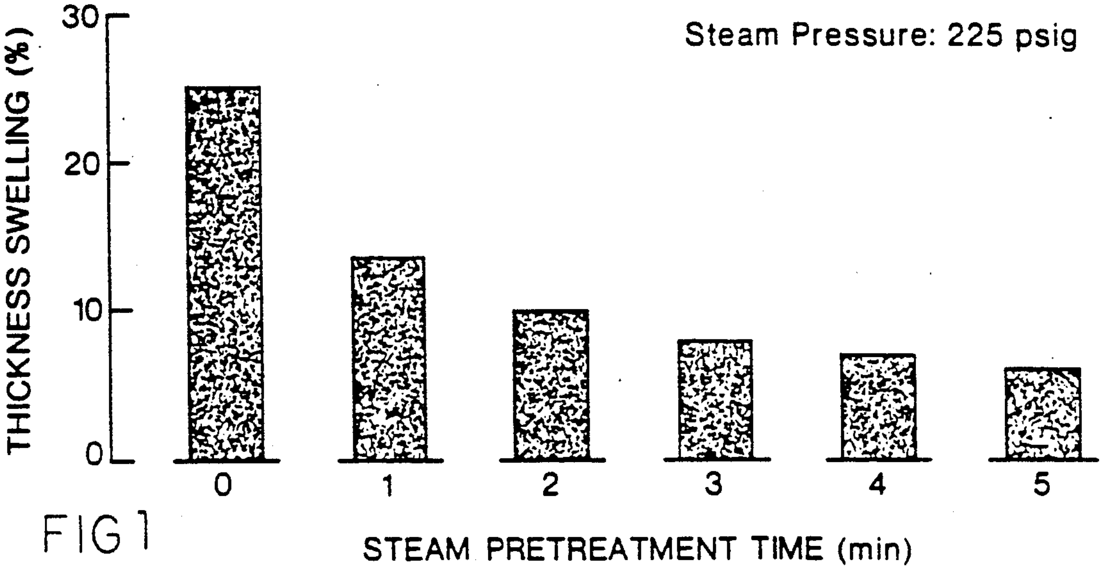
FIG. 1 illustrates the effect of steam pretreatment time on thickness swelling after 24 hour vertical cold water soaking.
Figure 2:
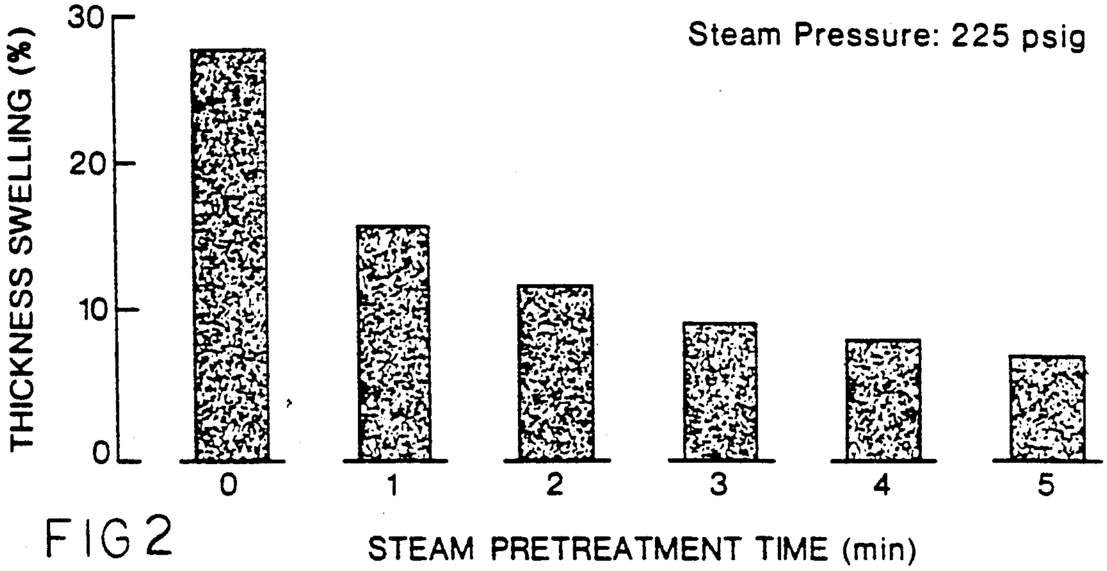
FIG. 2 illustrates the effect of steam pretreatment time on thickness swelling after 72 hour vertical cold water soaking.
Figure 3:
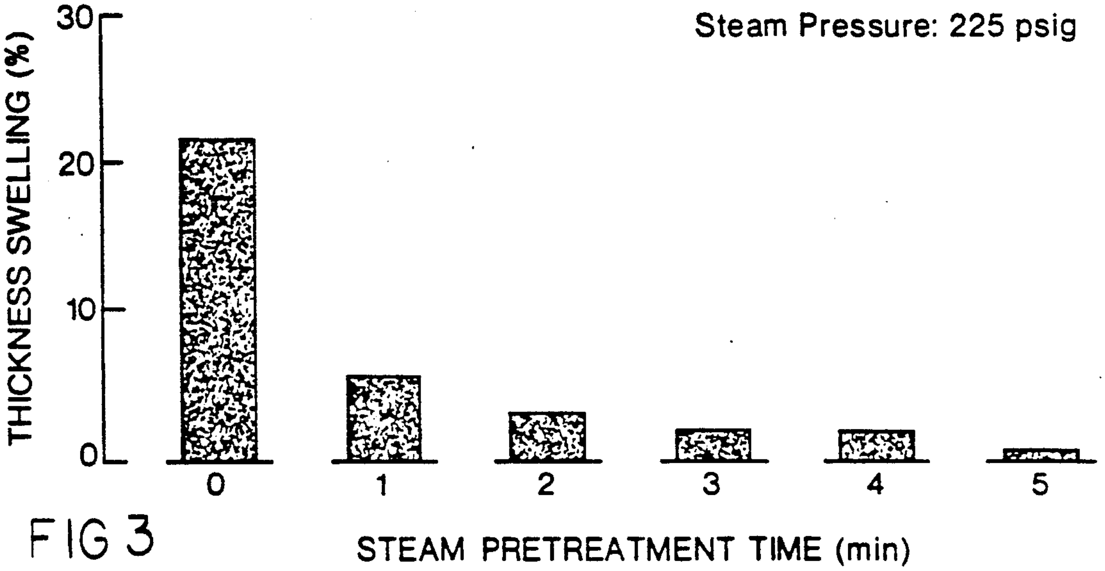
FIG. 3 illustrates the effect of steam pretreatment time on the irreversible thickness swelling of particleboard after 72 hour vertical cold water soaking and reconditioning.

In general, the most board properties changed progressively with increasing steam pretreatment time. Table 9 and FIGS. 1 and 2 show that the thickness swelling of the particleboard made with steam pretreated furnish was significantly lower than that of the control particleboard as measured by the vertical soak method for soaking periods of 24 and 72 hours, while Table 10 and FIG. 3 show that the irreversible thickness swelling of the particleboard was substantially reduced by steam pretreatment of the wood furnish as measured by the cold water vertically soak test for 72 hours and then reconditioned. The results also show that the values for total and irreversible thickness swelling of steam pretreated particleboard progressively decreased but with a reduced rate when the steam pretreatment time increased from 1 to 5 minutes.

TABLE 9

Effect of Steam Pretreatment Time on Thickness Swelling (TS) of Steam Pretreated Particleboard After Vertical Cold Water Soaking

| Pretreatment | 24 Hour Soak | | 72 Hour Soak | |
|---|---|---|---|---|
| Time, (min.) | TS (%) | Duncan Grouping[a] | TS (%) | Duncan Grouping[a] |
| 1 | 13.8 | A | 16.0 | A |
| 2 | 10.2 | B | 11.9 | B |
| 3 | 8.1 | C | 9.4 | C |
| 4 | 7.1 | D | 8.3 | D |
| 5 | 6.4 | E | 7.2 | E |
| 0 (control) | 25.4 | | 28.0 | |

[a]Means with the same letter are not significantly different at a significance level of 5%

TABLE 10

Effect of Steam Pretreatment Time on the Irreversible Thickness Swelling (TS) of Particleboard After 72 Hour Vertical Cold Water Soaking Followed by Reconditioning

| Pretreatment Time (min.) | Irreversible TS (%) | Duncan[a] Grouping |
|---|---|---|
| 1 | 5.8 | A |
| 2 | 3.3 | B |

TABLE 10-continued

Effect of Steam Pretreatment Time on the Irreversible Thickness Swelling (TS) of Particleboard After 72 Hour Vertical Cold Water Soaking Followed by Reconditioning

| Pretreatment Time (min.) | Irreversible TS (%) | Duncan[a] Grouping |
|---|---|---|
| 3 | 2.1 | C |
| 4 | 2.0 | C |
| 5 | 0.8 | D |
| 0 (control) | 22.1 | |

[a]Means with the same letter are not significantly different at a significance level of 5%

TABLE 11

Effect of Steam Pretreatment Time on the Linear Expansion of Particleboards with Change in Relative Humidity from 50% to 90%

| Pretreatment Time, (min.) | Means of Linear Expansion, (%) | Duncan[a] Grouping |
|---|---|---|
| 1 | 0.33 | A |
| 2 | 0.28 | B |
| 3 | 0.26 | B C |
| 4 | 0.24 | C D |
| 5 | 0.24 | D |
| 0 (control) | 0.48 | |

[a]Means with the same letter are not significantly different at a significance level of 5%

TABLE 12

Effect of Steam Pretreatment Time on the Thickness Swelling of Particleboards with Change in Relative Humidity from 50% to 90%

| Pretreatment Time, (min.) | Thickness Swelling, (%) | Duncan[a] Grouping |
|---|---|---|
| 1 | 5.3 | A |
| 2 | 4.7 | B |
| 3 | 3.7 | B C |
| 4 | 3.9 | B C |
| 5 | 3.6 | C |
| 0 (control) | 12.1 | |

[a]Means with the same letter are not significantly different at a significance level of 5%

TABLE 13

Effect of Steam Pretreatment Time on the Moduli of Elasticity and Rupture (MOE and MOR) of Particleboards

| Pretreatment | Observed Means | | | Adjusted Means[a] | | Significance[b] Grouping | |
|---|---|---|---|---|---|---|---|
| Time, (min.) | Density ($lb/ft^3$) | MOE ($10^3$ psi) | MOR (psi) | MOE ($10^3$ psi) | MOR (psi) | MOE | MOR |
| 1 | 42.8 | 597 | 3264 | 601 | 3283 | C | A |
| 2 | 42.8 | 598 | 3257 | 606 | 3300 | C | A |
| 3 | 43.3 | 624 | 3211 | 613 | 3174 | B | A |
| 4 | 43.2 | 684 | 3084 | 680 | 3058 | A | A |
| 5 | 43.0 | 650 | 2846 | 653 | 2861 | B | B |
| 0 (control) | 43.2 | 531 | 3171 | | | | |

[a]At a density of 43 $lb/ft^3$
[b]Means with the same letter are statistically significant different at a significance level of 5%

TABLE 14

Effect of Steam Pretreatment Time on the Internal Bond Strength (IB) of Particleboards

| Pretreatment | Observed Means | | Adjusted[a] | Significance[b] |
|---|---|---|---|---|
| Time, (min.) | Density, ($lb/ft^3$) | IB, (psi) | IB, (psi) | Grouping |
| 1 | 42.5 | 131 | 131 | A |
| 2 | 42.5 | 121 | 121 | B |
| 3 | 42.5 | 118 | 117 | B |
| 4 | 42.5 | 98 | 97 | C |
| 5 | 42.0 | 99 | 91 | C |

TABLE 14-continued

Effect of Steam Pretreatment Time on the Internal Bond Strength (IB) of Particleboards

| Pretreatment | Observed Means | | Adjusted[a] | Significance[b] |
|---|---|---|---|---|
| Time, (min.) | Density, ($lb/ft^3$) | IB, (psi) | IB, (psi) | Grouping |
| 0 (control) | 41.5 | 117 | | |

[a]At a density of 42.4 $lb/ft^3$
[b]Means with the same letter are not significantly different at a significance level of 5%

Figure 4:
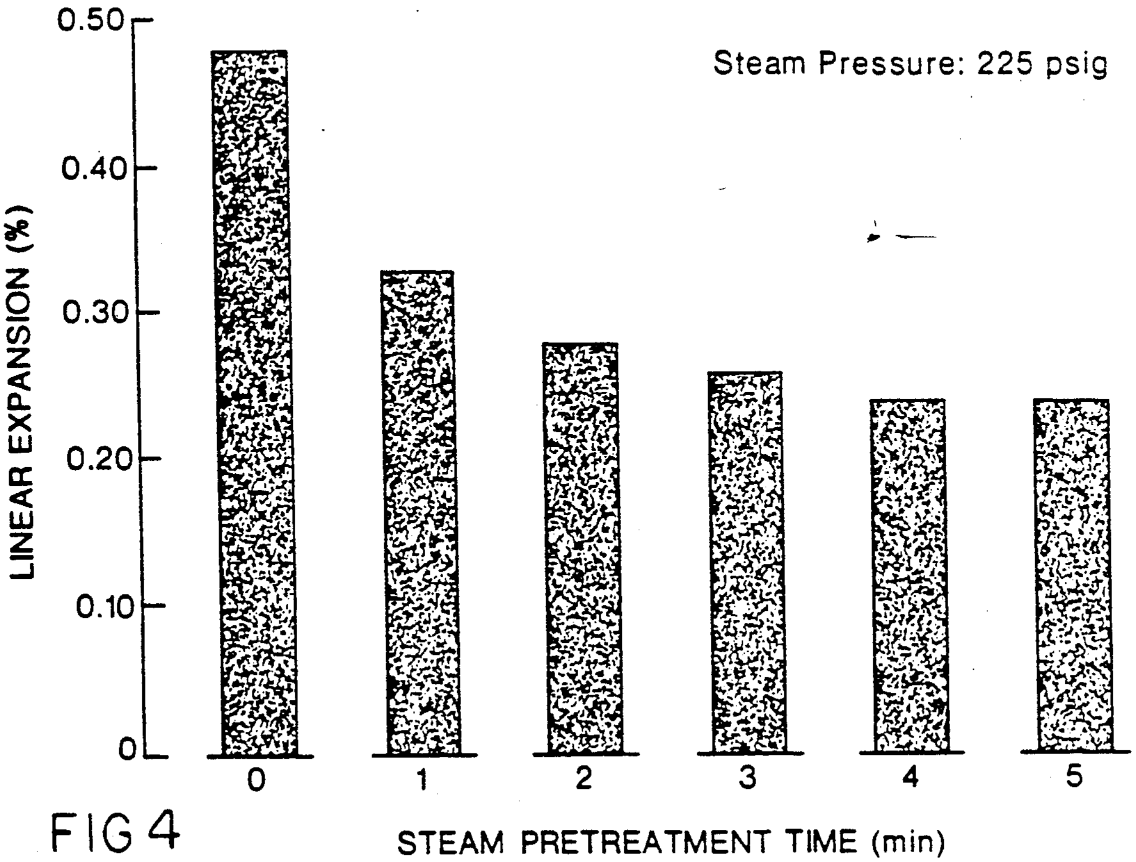
FIG. 4 illustrates the effect of steam pretreatment time on the linear expansion of particleboard, from 50 percent to 90 percent relative humidity.
Figure 5:
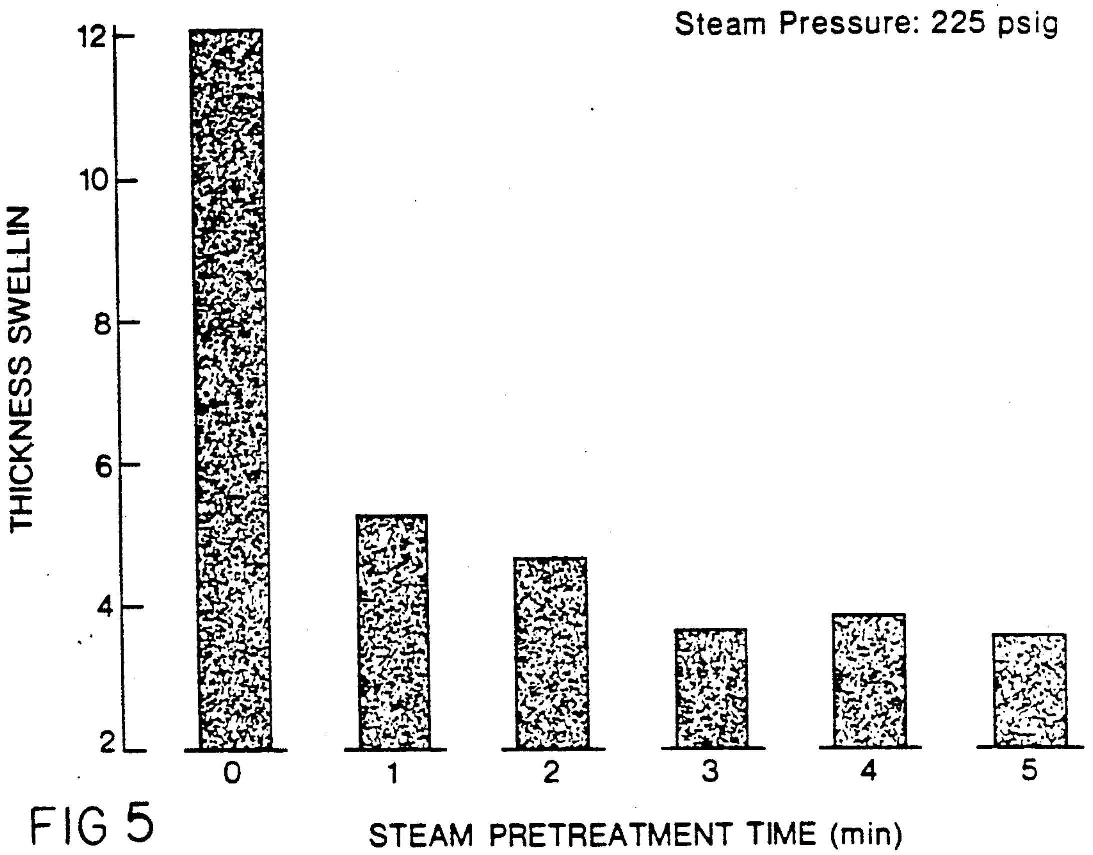
FIG. 5 illustrates the effect of steam pretreatment time on the thickness swelling of particleboard, from 50 percent to 90 percent relative humidity.

The linear expansion and thickness swelling of particleboard were also reduced by steam pretreatment (Tables 11 and 12 and FIGS. 4 and 5) when the specimens were changed from a relative humidity of 50% to that of 90%. The linear expansion gradually decreased with increasing pretreatment time from 1 to 4 minutes and then levelled off for treatments of 4 to 5 minutes (Table 11). The thickness swelling gradually decreased with pretreatment times from 1 to 3 minutes and then levelled off for 3 to 5 minute treatments.

Figure 6:
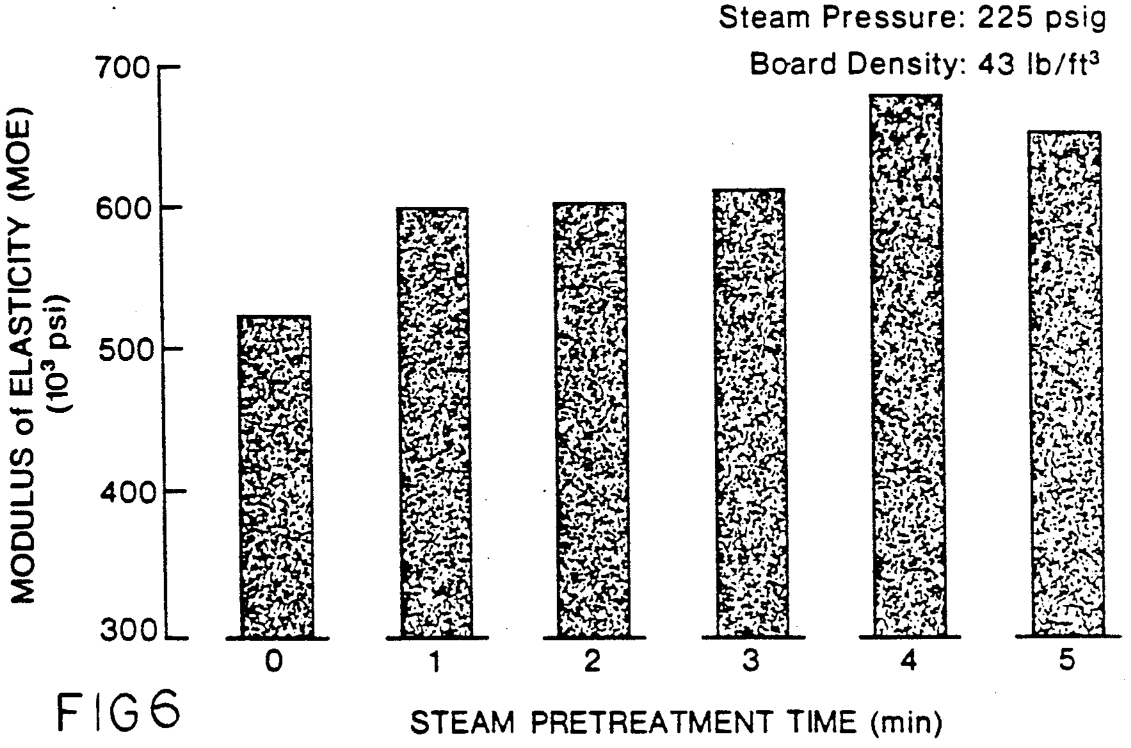
FIG. 6 illustrates the effect of steam pretreatment time on the modulus of elasticity of particleboard.
Figure 7:
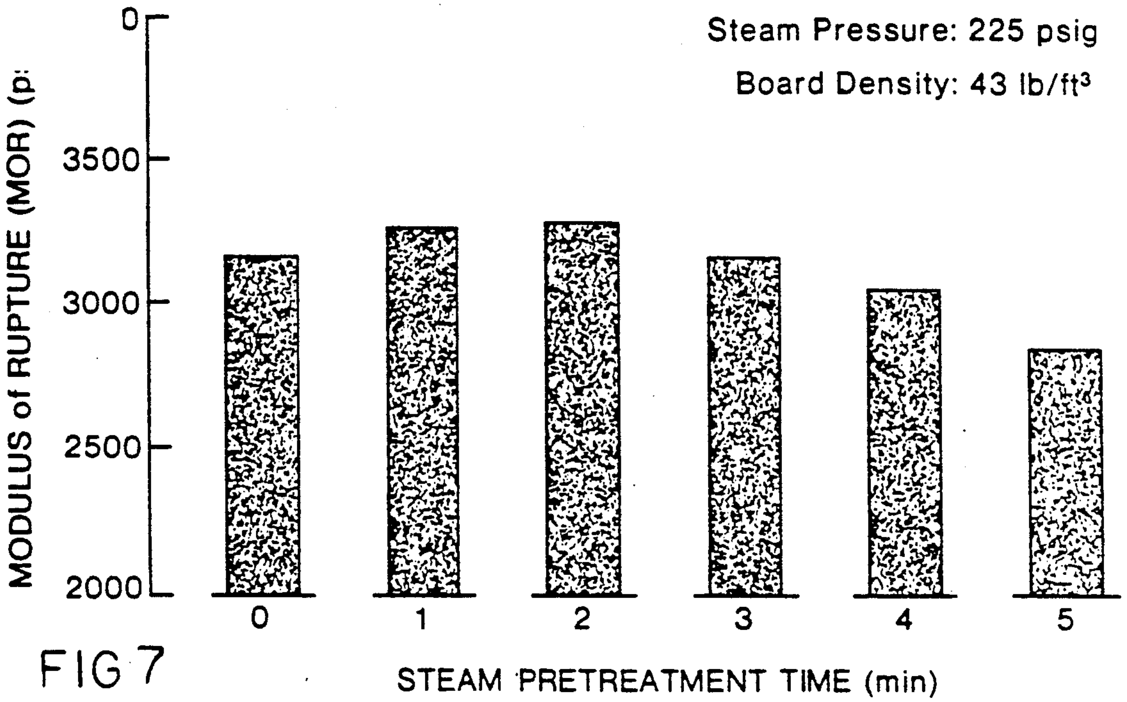
FIG. 7 illustrates the effect of steam pretreatment time on the modulus of rupture of particleboard.
Figure 8:
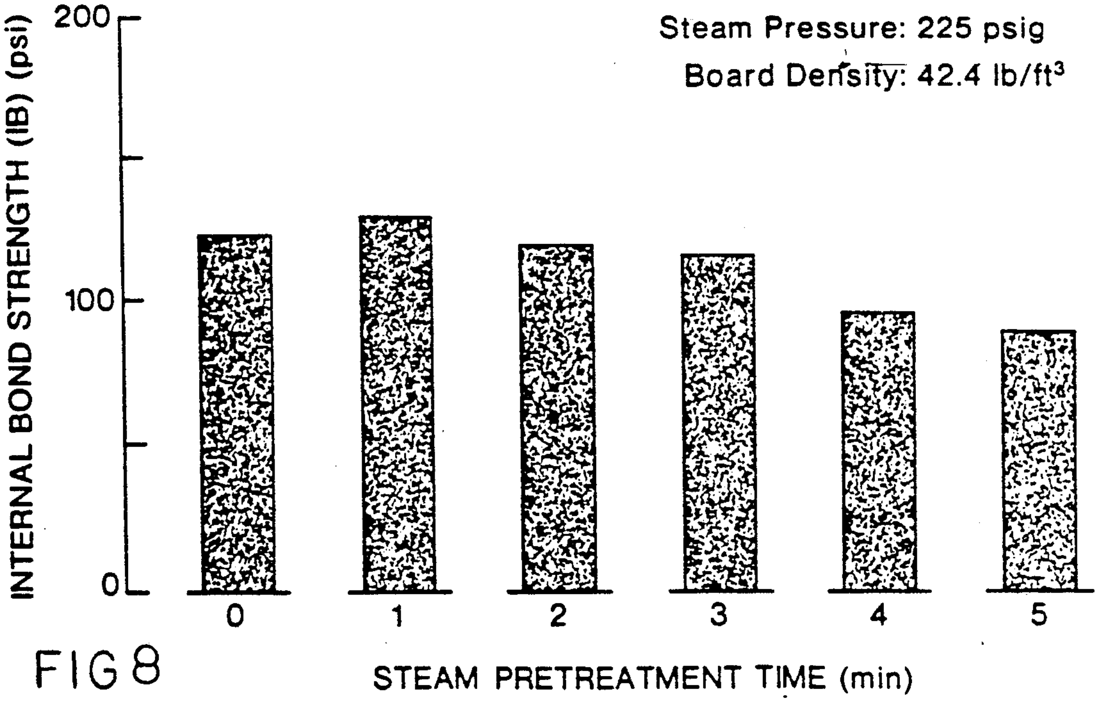
FIG. 8 illustrates the effect of steam pretreatment time on the internal bond strength of particleboard panels.

The MOE of particleboard was affected slightly by increasing steam pretreatment times of 1 to 5 minutes (Table 13 and FIG. 6) while the MOR was not significantly changed with increasing steam pretreatment times of 1 to 4 minutes but significantly decreased with increasing steam pretreatment times of 4 and 5 minutes (Table 13 and FIG. 7.) Results in Table 14 and FIG. 8 show that the internal bond strength (IB) tended to decrease with increasing steam pretreatment times of 1 to 5 minutes.

To explain the effect of pretreatment time on MOE, MOR and IB, the layer density of particleboards were determined. Table 15 shows that the density of the face layers tended to increase while the core layers tended to decrease as the steam pretreatment times increased. Examination of results in Tables 13 and 15 indicates that the MOE of particleboard was heavily dependent on the density of the face layers while the MOR was dependent not only on the density of face layers but also on other factors. The MOR also depends on the subsequent layers below the face and the degree of steam pretreatment.

TABLE 15

Effect of Steam Pretreatment Time on the Layer Density of Particleboards

| Pretreatment[a] | Average | Layer Density[b], ($lb/ft^3$) | | |
|---|---|---|---|---|
| Time, (min.) | Density, ($lb/ft^3$) | Outer | Intermediate | Center |
| 1 | 42.4 | 56.4 | 34.7 | 31.3 |
| 2 | 41.3 | 56.6 | 33.3 | 30.0 |
| 3 | 42.4 | 58.6 | 34.5 | 28.5 |
| 4 | 42.2 | 59.6 | 34.3 | 28.0 |
| 5 | 41.9 | 59.6 | 33.3 | 27.3 |

TABLE 15-continued

Effect of Steam Pretreatment Time on the Layer Density of Particleboards

| Pretreatment[a] Time, (min.) | Average Density, (lb/ft$^3$) | Layer Density[b], (lb/ft$^3$) Outer | Intermediate | Center |
|---|---|---|---|---|
| 0 (control) | 41.7 | 54.4 | 35.6 | 31.1 |

[a]Treated at a steam pressure of 225 psig
[b]The board was divided into 5 layers of approximately equal thickness as outer, intermediate, center, intermediate and outer layers from top to bottom surfaces. The density of the first three layers were determined. The thickness of each layer was approximately 1/5 of the board thickness.

TABLE 16

Effect of Press Pressure on the Thickness Swelling (TS) of Steam Pretreated Particleboards After Cold Water Soaking

| Press Pressure, (psi) | 24 Hour Soak TS, (%) | 24 Hour Soak Duncan Grouping[a] | 72 Hour Soak TS, (%) | 72 Hour Soak Duncan Grouping[a] |
|---|---|---|---|---|
| 250 | 8.8 | A | 10.0 | A |
| 550 | 8.3 | B | 9.4 | B |
| 700 | 7.9 | B | 8.9 | C |
| 400 | 7.2 | C | 8.3 | D |

[a]Means with the same letter are not significantly different at a significance level of 5%

TABLE 17

Effect of Press Pressure on the Linear Expansion of Steam Pretreated Particleboards with Change in Relative Humidity from 50% to 90%

| Press Pressure, (psi) | Linear Expansion, (%) | Duncan[a] Grouping |
|---|---|---|
| 250 | 0.24 | A |
| 400 | 0.24 | A |
| 550 | 0.24 | A |
| 700 | 0.23 | A |

[a]Means with the same letter are not significantly different at a significance level of 5%

TABLE 18

Effect of Press Pressure on the Thickness Swelling of Steam Pretreated Particleboards with Change in Relative Humidity from 50% to 90%

| Press Pressure, (psi) | Average Thickness Swelling, (%) | Duncan[a] Grouping |
|---|---|---|
| 250 | 4.1 | A |
| 400 | 3.9 | A |
| 550 | 3.6 | A |

TABLE 18-continued

Effect of Press Pressure on the Thickness Swelling of Steam Pretreated Particleboards with Change in Relative Humidity from 50% to 90%

| Press Pressure, (psi) | Average Thickness Swelling, (%) | Duncan[a] Grouping |
|---|---|---|
| 700 | 3.7 | A |

[a]Means with the same letter are not significantly different at a significance level of 5%

TABLE 19

Effect of Press Pressure on the Moduli of Elasticity and Rupture (MOE and MOR) of Steam Pretreated Particleboards

| Press Pressure | Observed Means | | | Adjusted Means[a] | | Significance[b] |
|---|---|---|---|---|---|---|
| (psi) | Density (lb/ft$^3$) | MOE ($10^3$ psi) | MOR (psi) | MOE ($10^3$ psi) | MOR (psi) | Grouping |
| 250 | 43.6 | 540 | 2616 | 540 | 2606 | C |
| 400 | 43.1 | 684 | 3084 | 684 | 3083 | A |
| 550 | 42.7 | 648 | 2895 | 649 | 2903 | A |
| 700 | 42.8 | 641 | 2771 | 642 | 2776 | B |

[a]At a density of 43.1 lb/ft$^3$
[b]Means with the same letter are not significantly different at a significance level of 5%

TABLE 20

Effect of Press Pressure on the Internal Bond Strength (IB) of Steam Pretreated Particleboards

| Press Pressure | Observed Means | | Adjusted Means[a] | Significance[b] |
|---|---|---|---|---|
| (psi) | Density (lb/ft$^3$) | IB (psi) | IB (psi) | Grouping |
| 250 | 41.3 | 91 | 95 | A |
| 400 | 42.7 | 98 | 97 | A |
| 550 | 42.5 | 97 | 97 | A |
| 700 | 43.7 | 102 | 99 | A |

[a]At a density of 42.5 lb/ft$^3$
[b]Means with the same letter are not significantly different at a significance level of 5%

TABLE 21

Effect of Press Pressure on the Layer Density of Steam Pretreated Particleboards

| Press Pressure (psi) | Average Density (lb/ft$^3$) | Layer Density[a] (lb/ft$^3$) Outer | Intermediate | Center |
|---|---|---|---|---|
| 250 | 41.3 | 53.0 | 35.7 | 29.0 |
| 400 | 42.2 | 59.6 | 34.3 | 28.0 |
| 550 | 42.1 | 59.5 | 33.5 | 28.5 |
| 700 | 42.0 | 57.3 | 33.8 | 31.2 |

[a]The board was divided into 5 layers of approximately equal thickness as outer, intermediate, center, intermediate and outer layers from top to bottom surface and the density of first three layers was determined.

This suggests that the furnish has been over-treated when a treatment time of 5 minutes at a steam pressure of 225 psig was employed.

While specified embodiments of this invention have been disclosed herein, those skilled in the art will appreciate that changes and modifications may be made therein without departing from the concept and scope of this invention as defined in the appended claims.

I claim:

1. A method of making synthetic board comprising the steps of:

(a) forming a pretreated cellulosic material in a pretreatment step by subjecting particle form cellulosic material, to the non-explosive action of steam for a period of one to six minutes at a pressure in the range of 350 to 150 psig to thereby form said pretreated cellulosic material which can result in lowering xylan content for hardwoods and the content of xylan, mannan and galactan for softwoods;

(b) forming a mat comprising a plurality of layers of particle form cellulosic material and wherein at least some layers of the mat are formed from said pretreated cellulosic material, and (c) subjecting said mat to a single treatment of heat and pressure so as to avoid cellular breakdown, to form said composite board, said formed board having improved dimensional stability due to the presence of the pretreated cellulosic material subjected to said pretreatment step of steam and pressure.

2. A method as defined in claim 1 wherein a binder is added to the particles forming the mat, said binder comprising a powdered phenolformaldehyde resin.

3. A process for producing a synthetic board as defined in claim 1 wherein said board comprises layers of cellulosic chip material and wherein said chip material in at least some of the layers have been subjected to a pretreatment of steam and pressure.

4. A method of producing synthetic board as defined in claim 1 wherein the outermost layers of the mat comprise the pretreated chip material.

5. A method of producing synthetic board as defined in claim 1 wherein the core portion only of the board comprises pretreated chip material.

6. A method as defined in claim 5 wherein the formed composite board is later subjected to a heat treatment to stabilize the outer layers.

7. A method of making highly stable wood-based composites consisting of non-explosively treating particle form cellulosic material with saturated steam at a pressure in the range of 350 to 150 psig for a period of one to six minutes, adding a binder to the treated particles and subjecting a mass of the treated particles and binder to a single treatment of heat and pressure to form a rigid composite article, said heat and pressure being sufficiently low so as to avoid cellular breakdown of the treated material.

8. A method of making wood fiber products comprising the steps of:

(a) forming a pretreated material in a pretreatment step by subjecting ligno-cellulosic material to the non-explosive action of steam for a period of one to six minutes and pressure in the range of 350 to 150 psig to form said pretreated material having a significant reduction in xylan content for hardwoods and in the content of xylan, mannan and galactan for softwoods;

(b) defibrating and/or refining said pretreated material to provide a furnish;

(c) drying the furnish and blending the same with an adhesive;

(d) forming a mat from said material of step (c) having said adhesive blended therein; and (e) subjecting said mat to a single treatment of heat and pressure to form a fiber product, said heat and pressure of step (e) being sufficiently low so as to avoid cellular breakdown of the pretreated material, said formed product having improved dimensional stability due to the presence of the steam and pressure pretreatment of the wood material compared with fiber products formed without pretreatment of the wood material.

9. A method of making wood fiber products comprising the steps of:

(a) defibrating and/or refining wood chips to provide a fibrous ligno-cellulosic material furnish, (b) subjecting the furnish to the non-explosive action of steam for a period of one to six minutes at a pressure in the range of 350 to 150 psig to cause a significant reduction in xylan content for hardwood and the content of xylan, mannan, and galactan for softwood, (c) drying the furnish and blending the same with an adhesive, (d) forming a mat from the furnish having the adhesive blended therein; and, (e) subjecting said mat to a single treatment of heat and pressure to form a fiber product, said heat and pressure of step (e) being sufficiently low so as to avoid cellular breakdown of the pretreated material, said formed product having improved dimensional stability due to the presence of the steam and pressure pretreatment of the wood material.

10. A process for producing a synthetic board as defined in claim 9 wherein said board comprises layers of cellulosic chip material and wherein said chip material in at least some of the layers have been subjected to a pretreatment of steam and pressure.

* * * * *